Nov. 7, 1967  S. H. CREED ET AL  3,351,112
REMOVING SKIN FROM FRUIT
Filed July 12, 1965  2 Sheets-Sheet 1
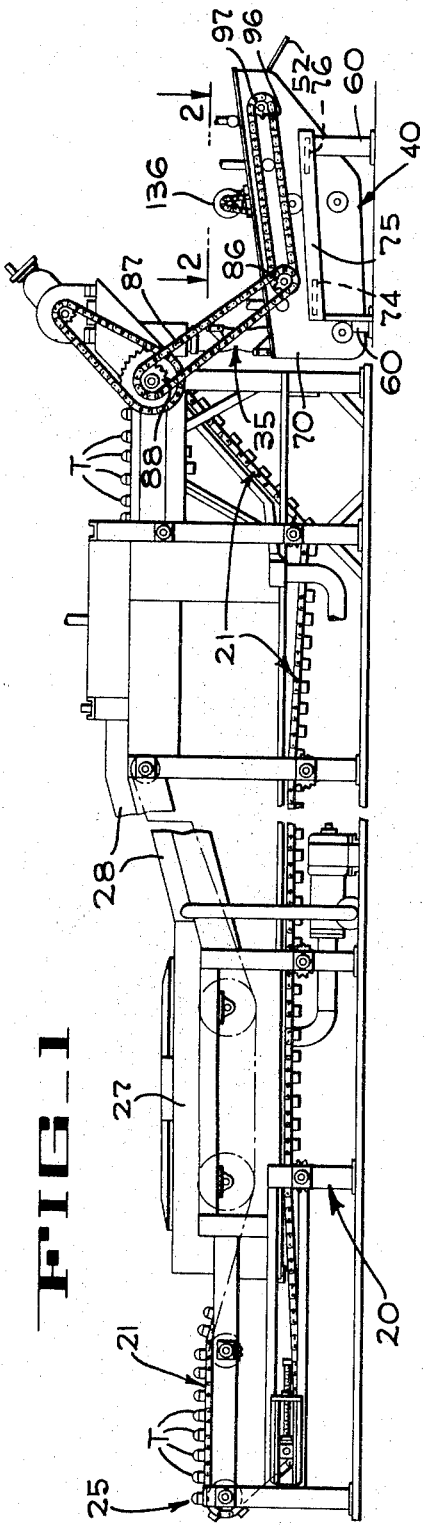
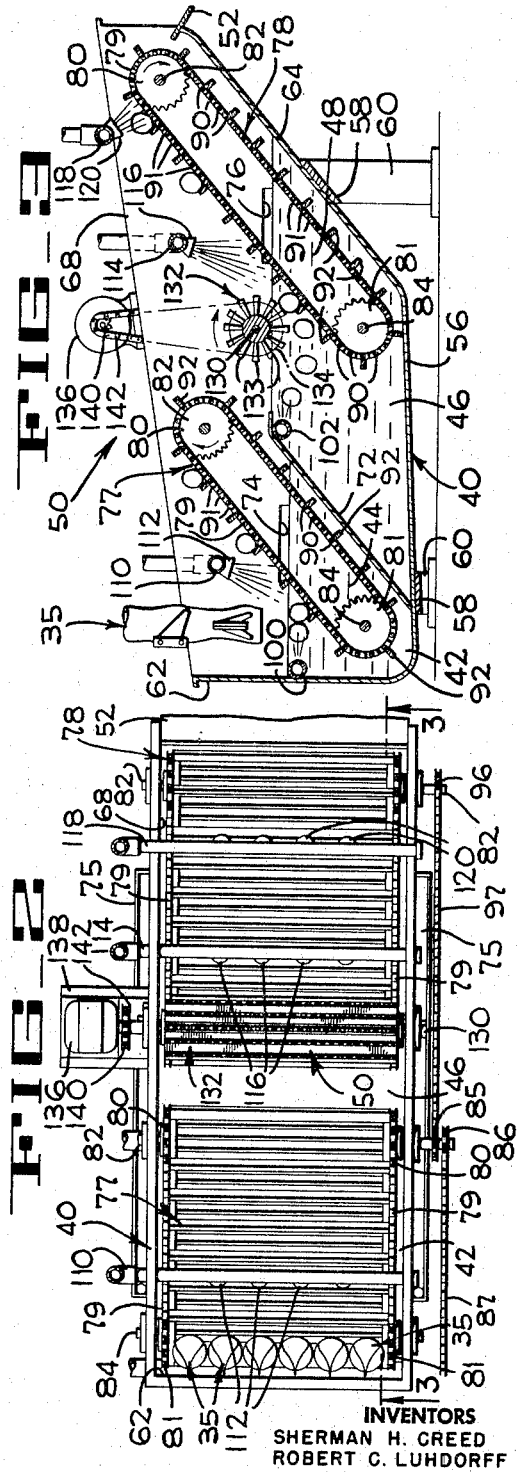
INVENTORS
SHERMAN H. CREED
ROBERT C. LUHDORFF
BY Hans G. Hoffmeister
ATTORNEY

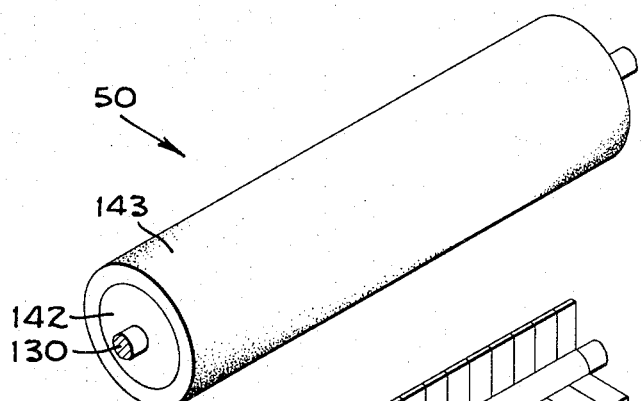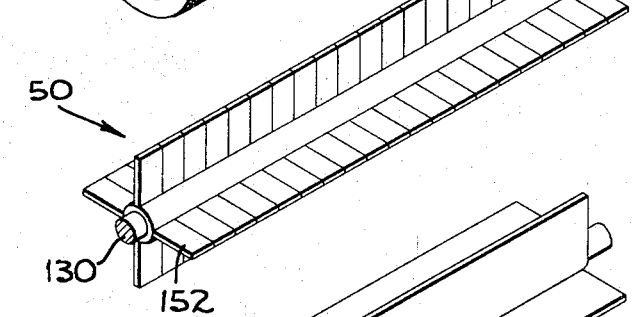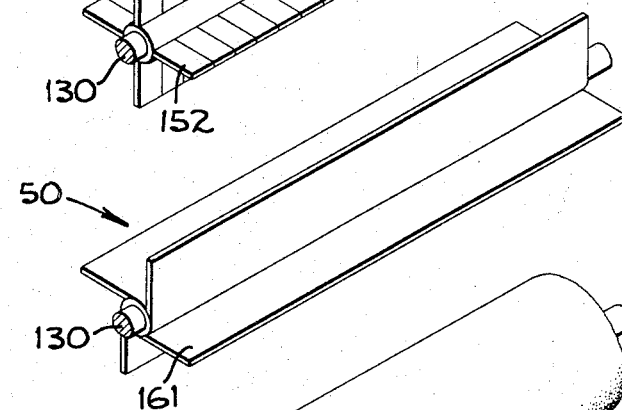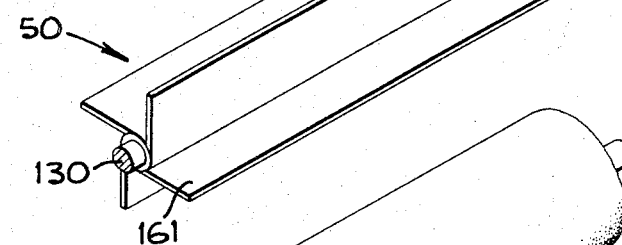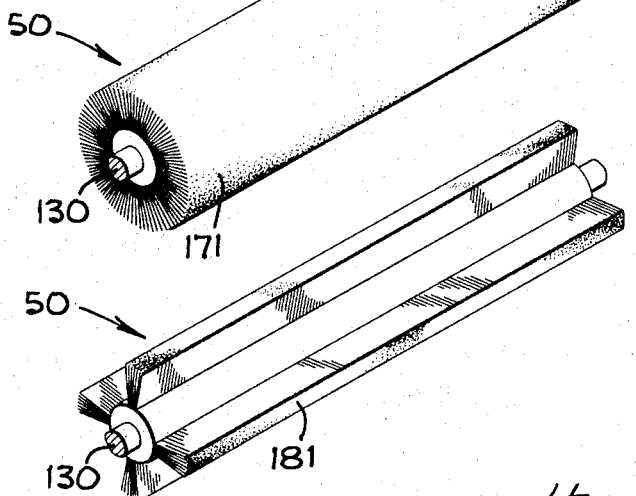

3,351,112
REMOVING SKIN FROM FRUIT
Sherman H. Creed, San Jose, and Robert C. Luhdorff, Campbell, Calif., assignors to FMC Corporation, San Jose, Calif., a corporation of Delaware
Filed July 12, 1965, Ser. No. 471,160
6 Claims. (Cl. 146—226)

ABSTRACT OF THE DISCLOSURE

Partially peeled tomatoes are floated in a liquid tank and a rotary brush agitates the liquid and engages the fruit as an inclined conveyor carries the fruit out from the tank. A liquid spray jet assists in completing the peeling action.

---

This invention pertains to skin removing devices, and more particularly to removing the skins or remnants of skins from fruit which have undergone a skin loosening operation.

When fruit, such as tomatoes, are subjected to a caustic treatment the skins are left in a loosened state on the bodies of the tomatoes. Normally the tomatoes would then be subjected to a coring operation which would cut through the skins into the bodies of the tomatoes. Subsequently, the tomatoes would be engaged in some manner so that the cut and loosened skins would be peeled from the bodies of the tomatoes. However, when the relatively coreless varieties of tomatoes, such as the VF–145, and its hybrid forms, Italian pear-shaped, 131 oblongs and other types are being processed it is unnecessary to subject them to a coring or cutting operation. As a result the skins although loosened remain relatively intact and the subsequent skin removing operation would occasionally be unable to completely remove all of the skins. Particularly is this so in untreated skin areas, around blemishes and at blossom ends where tags, i.e., pieces of skins, exist which have a tendency to cling to the tomatoes more tightly than the removed skins.

Although the apparatus of the present invention is best employed for removing the remnants or pieces of the skin which are still clinging to the body of the fruit after the skin removal operation, it will also in some cases completely remove a loosened but completely intact skin.

It is an object, therefore, of this invention to provide an apparatus which will effectively remove previously loosened skins from produce.

It is another object of the invention to provide an apparatus which will remove remnants and pieces of skin which are clinging to the body of fruit which have been subjected to a skin loosening and preliminary removing operation.

It is another object of this invention to provide apparatus for removing remnants and pieces of skin from caustically treated tomatoes while rinsing the bodies of the tomatoes free of the caustic treating solution.

The invention provides a method and means of more completely removing loose skins from the bodies of fruit and vegetables than the coring and water spray methods of the prior art. This is accomplished by contacting the fruits and/or vegetables to the rubbing and agitating action of solid friction surfaces while under and on the surfaces while under and on the surface of the water. By friction surface is meant any surface which makes friction contact with the skins of the fruit and/or vegetables. Removal is brought about by rapid movement of the water contiguous to the skin as well as by the contact with the solid surfaces, the water movement being enhanced when the solid surfaces are undergoing movement. In the preferred embodiment the solid surfaces comprise rotating members of various designs, e.g., brushes and paddles, but friction surfaces of rectilinear or other movement may also be used. The friction surfaces may also be a plurality of stationary elongated members disposed to contact vegetables and/or fruit during flow past the friction surfaces. Additional novelty resides in the structural combinations disclosed hereinafter.

The effectiveness of the peel removing operation is further enhanced by subjecting the tomatoes to a forceful fluid spray while they are being agitated so that the spray impinges against the remaining skin pieces and washes them away.

The invention will best be understood by referring to the following description and the accompanying drawings in which:

FIGURE 1 is a side elevation of the skin removal unit of the present invention connected to the discharge end of a fruit processing machine.

FIGURE 2 is an enlarged horizontal section of the skin removal unit taken along the line 2—2 of FIGURE 1.

FIGURE 3 is a vertical section taken along the line 3—3 of FIGURE 2.

FIGURE 4 is a perspective view of a portion of the skin removing unit of the invention showing a roller covered with a soft material;

FIGURE 5 is a perspective view of a portion of the skin removing unit of the invention showing a shaft having paddles extending therefrom at equi-distant radial positions;

FIGURE 6 is a perspective view of a portion of the skin removing unit of the invention showing a shaft having offset paddles extending therefrom at equi-distant radial positions;

FIGURE 7 is a perspective view of a portion of the skin removing unit of the invention showing a roller covered with bristles; and FIGURE 8 is a perspective view of a portion of the skin removing unit of the invention showing a shaft having soft bristle paddles extending therefrom at equi-distant radial positions.

In general, the fruit processing machine shown in FIGURE 1 comprises an elongated support 20 on which is mounted an endless chain conveyor 21 having an upper run movable toward the right, as shown in FIGURE 1, to carry tomatoes T through a series of processing stations. At a loading station 25, tomatoes are individually placed on the conveyor 21. As the tomatoes are carried to the right, they pass into a tank 27 in which they are treated for a predetermined time with a caustic solution such as lye. After leaving the lye tank, the tomatoes are carried upwardly inside an inclined housing 28 in which excess lye is drained from the tomatoes, and the tomatoes are exposed to a steam atmosphere for a fixed period of time during which the lye on the skins penetrates to the desired depth to effect partial rupturing and loosening of the skin from the flesh of the tomato bodies. After leaving the housing 28 with their skins substantially completely loosened from the flesh of the bodies of the tomatoes, the tomatoes are discharged from the conveyor 21 and directed downwardly through a preliminary skin removing unit 35, in the form of a tube having a plurality of projections on its inner surface, where most of the skin is separated from the flesh of the tomato. A typical unit which may be used is disclosed in U.S. Patent No. 3,024,821. A complete description of the other details of the processing machine described up to this point may be had by referring to U.S. Patent No. 3,096,800 issued to S. H. Creed et al., said description being incorporated by reference herein.

After leaving the skin removing unit 35, each tomato drops into a tank washer 40 which is divided into a first or preliminary rinsing section 42 which contains a fluid medium such as a water bath 44. The tank also is provided with a second or final rinsing section 46 which contains a second water bath 48 and a final skin removing friction contact unit 50. Downstream of the tank 40, to the right as viewed in FIG. 3, is a discharge chute 52 upon which the tomato is placed in a manner to be hereinafter described and which directs the tomato to a subsequent processing station.

The tank washer 40 will best be described by referring to FIGURES 2 and 3 wherein an upwardly sloping bottom wall 56 is illustrated as being secured to cross members 58 which are in turn mounted between legs 60. Formed integrally with the bottom wall 56 are an upstream end wall 62 and an upwardly inclined downstream end wall 64. The downstream end wall 64 is terminated below the top of the tank to provide for the insertion of the discharge chute 52 which is secured to the upper edge of wall 64. Also secured to the bottom wall and the two end walls, in any well known water-tight manner, are two upright side walls 68 and 70 (FIG. 2). An upwardly sloping divider plate 72 is securely fastened to the bottom wall and the side walls in fluid tight relation as by welding. The plate 72 separates the tank washer into the aforementioned first or preliminary rinsing section 42 and the second or final rinsing section 46. Each of the sections contains a water bath which is maintained at a predetermined level by discharge ports 74 and 76, respectively, cut in the side walls. The discharge ports 74 in the first rinsing section are cut in the side walls lower than the discharge ports in the final rinsing section so that the level of the bath in the first section is lower than the level of the bath in the final section. The discharged water may either be recirculated, particularly the water discharged from the final rinsing section because this water is less contaminated by caustic, by piping, not shown, or directed to a discharge area by two troughs 75. It will also be seen that the top of the divider plate 72 is in line with the bottom of the discharge ports 76 such that a portion of the water in the final rinse section flows over the divider plate and serves as an auxiliary supply for the fluid bath in the first rinsing section.

The sections are provided with elevators 77 and 78 located respectively in the preliminary and final sections. The elevators are identical with the exception that the elevator 78 in the final rinsing section is longer than the elevator 77. Since the elevators are otherwise identical, only the elevator 77 will be described, it being understood that the description applies equally to elevator 78. The elevator 77 comprises a set of endless chains 79 which are trained around upper and lower sets of transversely spaced sprockets 80 and 81, respectively. The sprockets 80 and 81 are respectively secured to upper and lower transverse shafts 82 and 84. The shafts are mounted for rotation in the side walls 68 and 70 by any well known means with the lower shaft 84 being sealed to prevent water leakage out of the tank. The upper shaft 82 extends laterally beyond side wall 70 and has keyed thereto, at its distal end, a drive sprocket 85 (FIG. 2) and a driven sprocket 86. A chain 87 is trained around the driven sprocket 86 and around a sprocket 88 (FIG. 1) which forms a part of the drive mechanism for the processing machine. The details of the driving mechanism for the processing machine may be had by referring to the aforementioned U.S. Patent 3,096,800.

As shown diagrammatically in FIG. 3, a plurality of closely spaced rods 90 are secured to blocks 91 welded to the inner links of the chains 79 and are spaced closely enough to one another to prevent the passage of tomatoes therebetween while permitting a free flow of water to pass between the rods and out the discharge ports 74. Periodically the blocks have secured thereto an outwardly extending upstanding flight 92. When the chains 79 are driven in a clockwise direction (FIG. 3) the flights will engage the tomatoes and move them out of the bath and into the final rinsing section.

Tomatoes which are floating in the preliminary washing bath are induced to flow in the direction of the elevator 77 since the discharge ports 74 are disposed substantially to the right, as viewed in FIGURE 3, of the upper run of the elevator. Thus the water will flow between the bars and out the discharge ports while the tomatoes are held against the bars and are then engaged and lifted by the flights.

As aforementioned, the description of the elevator 77 is applicable to the elevator 78 with the exception that the upper shaft 82 in the elevator 78 is spaced a greater distance from its lower shaft than in the elevator 77 to accommodate the additional length of the elevator. The upper shaft 82 of the elevator 78 also extends outwardly beyond the side wall 70 and has secured thereto at its distal end a driven sprocket 96 (FIG. 2). A chain 97 is trained around the driven sprocket 96 and around the drive sprocket 85 which is keyed to the upper shaft 82 of the elevator 77. Thus, clockwise rotation of the elevator 77 will cause similar clockwise roation of the elevator 78. Also a similar water flow will be induced in the final rinsing section 46 because of the positioning of the discharge ports 76 to the right of the upper run of the elevator 78.

The water is introduced into the respective rinsing sections by a plurality of water sprays and water jets which will now be described. The sections 42 and 46 are provided with water pipes 100 and 102, respectively, which are secured to and pass through the side walls 68 and 70 in any suitable manner which will maintain the pipes in a horizontal position below the level of the fluid baths. The side walls are appropriately sealed around the pipes to prevent leakage. Each of the pipes is provided with transversely spaced orifices aligned horizontally and facing the downstream end of the tank washer or to the right as viewed in FIG. 3. The pipes are connected to a suitable water supply, not shown, and emit water jets through the orifices to cause the water directly in front of the pipes to circulate in a direction toward the downstream end of the tank washer. When tomatoes are introduced into either of the rinsing sections they are moved by the circulating water in a direction from left to right. Thus, these jets assist the circulatory motion from the left to the right created by the respective discharge ports.

A third water pipe 110 is secured to the side walls 68 and 70 and extends transversely within the first rinsing section 42 above the water bath and the elevator 77. The pipe is provided with a plurality of transversely spaced nozzles 112 which are directed at the upper run of the elevator in the vicinity of the water bath. The pipe is connected to a suitable water supply, not shown, and directs a forceful spray of rinsing water over the tomatoes as they are carried by the elevator out of the first rinsing bath. This forceful spray tends to remove pieces of skin which are adhering to the body of the skin.

A fourth water pipe 114 is fastened to the side walls 68 and 70 and is transversely disposed in the final rinsing section above the final rinse bath. The water pipe 114 is provided with a plurality of transversely spaced nozzles 116 which are directed at the upper run of the elevator 78 in the vicinity of the upper surface of the water bath. The water pipe 114 is also connected to a suitable water supply not shown and, when connected, the nozzles 116 direct a forceful stream at the tomatoes as they are emerging from the final rinse bath. The forceful stream emitting from the nozzles 116 acts in conjunction with the final skin removing friction contact unit 50 to not only remove pieces of skin which are adhering to the body portion of the tomatoes but also assist the unit in removing the pieces of skins or tags which are attached to the tomatoes, in a manner to be later described.

A fifth water pipe 118 is secured to the side walls 68 and 70 and is transversely disposed above the elevator 78 farther along the upper run of the elevator than the water pipe 114. The water pipe 118 is provided with a plurality of transversely spaced nozzles 120 which are directed in a direction normal to the elevator. The water pipe 118 is also connected to a water supply not shown and causes a final spray of water to wash any remaining loosely adhering particles of skin which may have been picked up by the bodies of the tomatoes during passage up the elevator. After the final rinse the elevator 78 discharges the now completely cleaned tomatoes onto the discharge chute 52 where they are subsequently directed to another processing station.

The final skin removing friction contact unit 50 is one of the most important aspects of this invention and will now be described by referring to FIGURES 2 and 3. The final skin removing friction contact unit 50 comprises a horizontal transverse shaft 130 rotatably mounted in the side plates 68 and 70. Keyed to the shaft 130 in the preferred embodiment is a rotary brush 132 having protruding spikes 133 which resemble radially projecting resilient fingers. These spikes or fingers may be composed of synthetic rubber, bristles, or other materials. The brush extends across substantially the entire width of the elevator 78 with the finger-like projections being spaced from the upper run of the elevator at their closest point a distance which is approximately equal to the largest tomato to be peeled. The shaft 130 extends outwardly of the side plate 68 and has keyed to its distal end a sprocket 134 (FIG. 3). A motor 136 is secured to a support plate 138 which is fastened to the side wall 68 by any suitable means. A drive sprocket 140 is keyed to the rotary shaft of the motor, and a chain 142 is trained around the sprocket 140 and the sprocket 134 to drive the rotary brush in a clockwise direction as indicated by the arrow in FIGURE 3. Although the brush could be rotated in either direction to be effective, it is preferable that the direction be counter to the direction of movement of the elevator 78. The finger-like projections of the rotary brush will then move in a direction opposed to the direction of the upper run of the elevator 78 as the projections pass the elevator. The brush is rapidly rotated to agitate the water just upstream of the elevator 78, and contacts the tomatoes as they are moved by the general flow of water toward the elevator. As a result of the agitation, the tomatoes will follow a circuitous path toward the elevator 78, occasionally bobbing against the fingers of the brush. The agitation of the water and the contacting by the brush then removes the remaining pieces of skin from the tomatoes. As the agitated tomatoes bob up and down in the rinsing bath, they continue to move into the path of the elevator where they are lifted out of the bath. As the tomatoes are being lifted they are further subjected to the forceful spray from the nozzles 116. The forceful spray directed at the still agitated tomatoes impinges against any remaining loosened bits of skin which may still be adhering to the tomatoes, removing all these remnants from the body portions of the tomatoes. The resulting tomatoes leaving the final rinse bath are substantially free from any pieces or remnants of skin and in excellent condition for further processing.

The skin removing friction contact unit 50 may also comprise other stationary and movable embodiments limited only by the wording of the claims appended hereto. However, in the preferred embodiment the skin removing friction contact unit functionally serves to rapidly churn the water surrounding the tomatoes, whereby frictional forces between the water and skin segments tend to separate the skin, and to rub against the tomatoes in a friction contact, whereby the skin separates. In the modified form of the invention shown in FIGURE 4 the friction contact unit 50 comprises a rotatable shaft 130 surrounded by a soft rubber core 142 and an outer layer 143 of resilient material, coarse or fine, as desired, such as urethane foam or sponge rubber. In FIGURE 5 the friction contact unit 50 is shown in the form of a rotatable shaft 130 having equi-distant paddles 152 radially attached thereto; the paddles preferably are composed of soft rubber material and may be serrated or split radially to provide individual contacting edges. In FIGURE 6 paddles 161 are shown similar to those of FIGURE 5 except that they are offset. In FIGURE 7 a friction contact unit is shown which is provided with bristles 171 radially protruding from a central rotatable cylindrical shaft 130. In the embodiment of FIGURE 8 bristles 181 are disposed along rotatable shaft 130 in a paddle geometry.

In the over all operation of the tank washer, the tomatoes are introduced into the preliminary rinsing section through the peeling unit 35 which substantially removes the major portion of the skins from most all of the tomatoes. The tomatoes drop into the first rinse bath and are moved by the jets emitting from pipe 110 and the predominant left to right flow of the rinsing fluid out through the discharge ports 74 into engagement with the upper run of the elevator 77. As the tomatoes are carried up the elevator 77, loose non-connected pieces of skins are washed from the tomatoes by the nozzles 112 and these pieces are then discharged with the fluid passing out the discharge ports 74. The tomatoes are then dropped into the final rinse bath in the section 46 and again are moved toward the upper run of the elevator 78 by the jets emitted from the water pipe 102 and the predominant flow of the rinse fluid from left to right out through the discharge ports 76. As the tomatoes are moved toward the elevator 78 they are first agitated and acted upon by the rotary brush 132. Then, as they are carried upward by the elevator, the tomatoes are additionally agitated while being sprayed by the nozzles 116 in the manner previously described. The tomatoes emerging from the final bath are then substantially cleaned of any particles of skin which may have been attached to the tomatoes entering the final rinsing bath and are given a final rinse by the water ejected from the nozzles 120 before they are discharged onto the chute 52.

Thus as can readily be seen this invention provides a relatively inexpensive apparatus for removing remnants of skins from tomatoes which would otherwise cling to the tomatoes and require expensive removal by hand labor. The brush, due to its particular location, effectively removes these particles of skin without damaging the body portions of the tomatoes. A still further advantage is that this final peel-removing operation takes place in the rinsing tank so that any of the caustic solution which might have been trapped under the skin of the tomato will be washed out leaving the tomatoes free of the treating solution.

It will be understood that modifications and variations of the invention disclosed herein may be made without departing from the scope of the present invention. Having thus described the invention, what is claimed as new and desired to be protected by Letters Patent is:

1. An apparatus for removing remnants of skins from fruit which have been subjected to a skin loosening and partial removing operation, comprising a tank having a liquid medium therein, an endless elevator having a plurality of fruit conveying flights mounted for movement through said liquid medium along an upwardly inclined path, rotating means positioned in said path for agitating the liquid and engaging the fruit whereby the fruit carried by said flights are subjected to a rubbing and agitating action by said rotating means and the remaining remnants of the skins are removed from the body of the fruit.

2. The apparatus defined by claim 1 including a liquid spray nozzle connected to a liquid supply and positioned to direct a forceful spray of liquid on the fruit as they are agitated by said rotating means whereby the rotating means is assisted in removing the skin remnants as a result of said spray.

3. The apparatus defined by claim 1 wherein said rotating means is provided with radially extending resilient projections.

4. An apparatus for removing remnants of skin from produce which have been subjected to a previous skin weakening operation comprising a tank having a preliminary rinse section and a final rinse section, rinsing liquid in each section, means for circulating the liquid in each section in a predetermined direction, a first endless flight conveyor in said preliminary rinse section positioned in the circulatory path of the liquid therein for moving the produce introduced into said preliminary rinse section out of said section and into said final rinse section, a second endless flight conveyor positioned to intercept the fruit in said final rinse section and move them along an upwardly inclined path out of said tank, a rotary brush-like element positioned in said final rinse section partially below the liquid level and closely adjacent said second endless flight conveyor, means for rotating said element in a direction which is in opposition to the direction of movement of said second flight conveyor as said flight conveyor moves past said element, and a forceful liquid spray directed at said second endless flight conveyor in the vicinity of said rotary element whereby said spray and said rotary element act on the fruit to remove all remnants of skin therefrom.

5. The method of removing loosened skins and pieces of skins from partially peeled produce comprising the steps of preliminarily contacting produce which have been subjected to a skin loosening treatment to partially remove the skins therefrom but in so contacting leaving pieces of skins still adhering to the bodies of the produce, immersing the produce in a liquid bath, and agitating the liquid while the produce are immersed in the bath to cause frictional contact by the agitated liquid against the loosened pieces of skins to remove them from the bodies of the produce.

6. The method defined by claim 5 including the step of engaging the produce with a solid frictional element while agitating the liquid to further assist in the removal of the pieces of skins.

References Cited
UNITED STATES PATENTS

| | | |
|---|---|---|
| 2,023,163 | 12/1935 | Burr. |
| 2,038,018 | 4/1936 | Wortelboer _____ 146—50 |
| 2,847,334 | 8/1958 | Kilburn et al. _____ 146—235 |
| 3,192,974 | 7/1965 | Hickey et al. _____ 146—50 |

JAMES M. MEISTER, *Primary Examiner.*